(12) United States Patent
Cohen (10) Patent No.: US 11,041,302 B2
(45) Date of Patent: Jun. 22, 2021

(54) WALL MODULE INCORPORATING CELLULAR CONCRETE IN A STACKING STRUCTURAL STEEL WALL FRAME

(71) Applicant: VEGA BUILDING SYSTEMS, LLC, Englewood, CO (US)

(72) Inventor: David L. Cohen, Englewood, CO (US)

(73) Assignee: Vega Building Systems LLC, Englewood, CO (US)

( * ) Notice: Subject to any disclaimer, the term of this patent is extended or adjusted under 35 U.S.C. 154(b) by 0 days.

(21) Appl. No.: 16/612,720

(22) PCT Filed: May 19, 2017

(86) PCT No.: PCT/US2017/033659
§ 371 (c)(1),
(2) Date: Nov. 11, 2019

(87) PCT Pub. No.: WO2018/212779
PCT Pub. Date: Nov. 22, 2018

(65) Prior Publication Data
US 2020/0165809 A1    May 28, 2020

(51) Int. Cl.
| | | |
|---|---|---|
| *E04B 1/14* | (2006.01) | |
| *E04B 2/56* | (2006.01) | |
| *E04B 2/58* | (2006.01) | |
| *E04C 2/28* | (2006.01) | |
| *E04C 2/38* | (2006.01) | |
| *B29C 44/18* | (2006.01) | |

(52) U.S. Cl.
CPC ............... *E04B 1/14* (2013.01); *E04B 2/562* (2013.01); *E04B 2/58* (2013.01); *E04C 2/28* (2013.01); *E04C 2/384* (2013.01); *B29C 44/186* (2013.01)

(58) Field of Classification Search
CPC ... E04B 1/14; E04B 2/562; E04B 2/58; E04C 2/28; E04C 2/384; E04C 2/049; E04C 2/205; B29C 44/186; B29C 44/1285
See application file for complete search history.

(56) References Cited

U.S. PATENT DOCUMENTS

| | | | |
|---|---|---|---|
| 3,685,229 A * | 8/1972 | Sale, Jr. | ............ E04C 2/384 |
| | | | 52/783.16 |
| 4,158,275 A | 6/1979 | Moore | |
| 4,226,061 A | 10/1980 | Day | |
| 4,554,124 A | 11/1985 | Sudrabin | |

(Continued)

FOREIGN PATENT DOCUMENTS

| | | |
|---|---|---|
| DE | 17 09 422 A1 | 6/1974 |
| GB | 1 036 638 A | 7/1966 |
| WO | WO 2011/010300 A2 | 1/2011 |

*Primary Examiner* — Basil S Katcheves
*Assistant Examiner* — Omar F Hijaz
(74) *Attorney, Agent, or Firm* — Graziano IP Law LLC (57) ABSTRACT

The present Cellular Concrete Filled Structural Steel Wall Frames are interconnected in three dimensions with other modular construction elements to enable the rapid construction of multi-story buildings with improved quality of construction over that found in traditional multi-story building construction techniques. These Cellular Concrete Structural Steel Wall Frames typically have a Thin Concrete Wall Panel affixed to the exterior of the structural steel, and also electrical and plumbing rough utility components installed in the Wall Frames.

12 Claims, 12 Drawing Sheets

(56) References Cited

U.S. PATENT DOCUMENTS

| | | | |
|---|---|---|---|
| 4,862,660 A * | 9/1989 | Raymond | E04B 1/0023 |
| | | | 52/220.2 |
| 4,970,838 A | 11/1990 | Phillips | |
| 5,055,252 A | 10/1991 | Zimmerman | |
| 5,279,089 A * | 1/1994 | Gulur | E04B 7/22 |
| | | | 52/284 |
| 5,375,809 A | 12/1994 | Goto | |
| 5,899,037 A * | 5/1999 | Josey | E04B 2/58 |
| | | | 428/118 |
| 6,014,842 A * | 1/2000 | Matsubara | E04B 5/14 |
| | | | 446/115 |
| 6,151,857 A | 11/2000 | Raschke | |
| 6,295,770 B1 | 10/2001 | Sheu | |
| 6,945,002 B2 * | 9/2005 | Zambelli | E04C 2/384 |
| | | | 52/601 |
| 7,647,742 B2 * | 1/2010 | Han | E04B 5/10 |
| | | | 52/741.1 |
| 7,784,223 B1 | 8/2010 | Ramey | |
| 8,132,388 B2 | 3/2012 | Nagy | |
| 8,448,387 B2 | 5/2013 | Hartmann | |
| 8,491,831 B2 | 7/2013 | Buedel | |
| 9,157,233 B2 | 10/2015 | Gosain | |
| 2005/0188649 A1 * | 9/2005 | Hagen, Jr. | E04B 1/7604 |
| | | | 52/782.1 |
| 2005/0284084 A1 * | 12/2005 | Blake, Jr. | E04B 1/26 |
| | | | 52/677 |
| 2009/0007512 A1 * | 1/2009 | Kernels | E01C 11/08 |
| | | | 52/396.02 |
| 2016/0208489 A1 * | 7/2016 | Gibson | E04B 7/22 |

* cited by examiner

FIGURE 12

WALL MODULE INCORPORATING CELLULAR CONCRETE IN A STACKING STRUCTURAL STEEL WALL FRAME

FIELD OF THE INVENTION

This invention relates to the use of a Wall Module Incorporating Cellular Concrete in a Stacking Structural Steel Wall Frame that interconnects the Wall Frames in three dimensions with other modular construction elements to enable the rapid construction of multi-story buildings with improved quality of construction over that found in traditional multi-story building construction techniques.

BACKGROUND OF THE INVENTION

There are a number of problems associated with the construction of multi-story buildings using the traditional construction techniques of Poured Concrete frame buildings, Pre-Cast Concrete frame buildings, conventional Structural Steel frame buildings, Wood frame buildings, and Masonry construction. Multi-story buildings constructed with these traditional construction techniques are built in the traditional manner of field craftsmen applying construction materials (dimensional lumber, thin gauge steel members, individual structural steel members) or hardscape materials (cinder block, brick, concrete) to fabricate the multi-story dwelling on a foundation at the building site according to a set of architectural plans. While there are few architectural, structural, or dimensional limitations, this construction technique requires a sequential, craft-based, field building format, where item A must be completed before item B can begin, and in turn, item B must then be completed before item C can begin and so on. For example, the ground level walls must be completed before the installation of utilities on the ground level can begin, the second level walls must be completed before substantial work on upper floor walls can begin, and the first floor walls on the building must be framed before finishes can be applied to the first floor walls. While this method of construction has worked for many years, there are inherent inefficiencies in this method that result in significant time, cost, and quality penalties.

Traditional construction techniques involve a lengthy process and, therefore, result in construction activity of extended duration. In addition, the finish work is accomplished only after the structural work is completed. This in situ fabrication results in a lack of quality, is prone to errors, and requires the workers to innovate with respect to the interconnection of utilities, thereby resulting in inconsistency in implementation. Advantages of traditional construction techniques are that these multi-story buildings can be built to any size or layout that is desired within the limitations of the structural capabilities of the framing material.

However, this construction process, especially early on, is highly dependent on weather conditions and most often can only occur during daylight hours. An interruption in the flow of construction caused by one of the subcontractors has a ripple effect in that each subcontractor must await the completion of another subcontractor's work before they can begin their work.

In many areas of the world, population growth is greatly exceeding the growth of available housing. Therefore, one of the primary building construction problems in the world is the ability to very rapidly build large quantities of housing to address the growing deficit. This problem is compounded by limited amounts of skilled labor at a reasonable cost. Traditional construction techniques are not responding to the existing and growing housing shortage, and new means of producing housing in very large quantities effectively and quickly are in great demand. Thus, traditional construction techniques fail to deliver the quantity, quality and speed of construction that is desirable. In many locations, these impediments result in a severe shortage of multi-story buildings and a commensurate lack of available quality buildings.

BRIEF SUMMARY OF THE INVENTION

The present Wall Module Incorporating Cellular Concrete In A Stacking Structural Steel Wall Frame (termed "Cellular Concrete Structural Steel Wall Modules" herein) has broad application worldwide since it has the ability to be used in a huge diversity of building products, with high quality, a decreased need for skilled labor, at low cost, built in a timely fashion, with an exceedingly high rate of production to address the present and growing deficits in the housing market.

In the preferred embodiment, the multi-story building is implemented by stacking structural steel frames without the use of stacking columns. Vertical Vierendeel trusses with vertical members of tube steel are used to implement the structural steel frame, thereby stacking trusses, not individual columns.

These prefabricated Cellular Concrete Structural Steel Wall Modules typically have electrical and plumbing rough utility components as well as window and door frames installed in them. A mix of cellular concrete is used to infill the Structural Steel Wall Frame to provide insulation and final finish or base for final finish exterior and interior wall surfaces. The cellular concrete can either be homogeneous using a predetermined formula to satisfy the insulation and density standards set for this project, or can be layered, with the exterior surface being hard and dense for weatherproofing and durability, while the interior fill is a lighter mix to provide enhanced insulation. Finally, another option is to make the interior facing surface of the wall a final layer of cellular concrete or other material having characteristics that enable the facing surface to be finished as an interior wall.

The completed Cellular Concrete Structural Steel Wall Modules are staged near the multi-story building under construction such that a crane can rapidly transport these modular elements into position on the building under construction. An inner "Mating Member" can be placed hanging out the bottom of each frame (or out of the top of the frame below) such that, when that frame is crane hoisted up into position, the Mating Member enables the frame to be perfectly positioned on top of the installed frame below, and the Mating Member also immediately holds the frame being installed in place as the Mating Member sticks into the column above and column below, and, as such, the wall being installed cannot lay over. The Wall Frame is immediately stable upon dropping it into position, and the positioning is perfect without effort. So Wall Frames, not individual columns, are stacked.

The paradigm of the present Cellular Concrete Structural Steel Wall Modules fundamentally changes the design process, construction program, and details of constructing multi-story buildings. The building process becomes a rapid assembly program of prefabricated modular building elements, instead of the stick-by-stick accumulation program by craft tradesmen in the field in the traditional construction techniques.

DETAILED DESCRIPTION OF THE INVENTION

Cellular Concrete Structural Steel Wall Module

Figure 1:
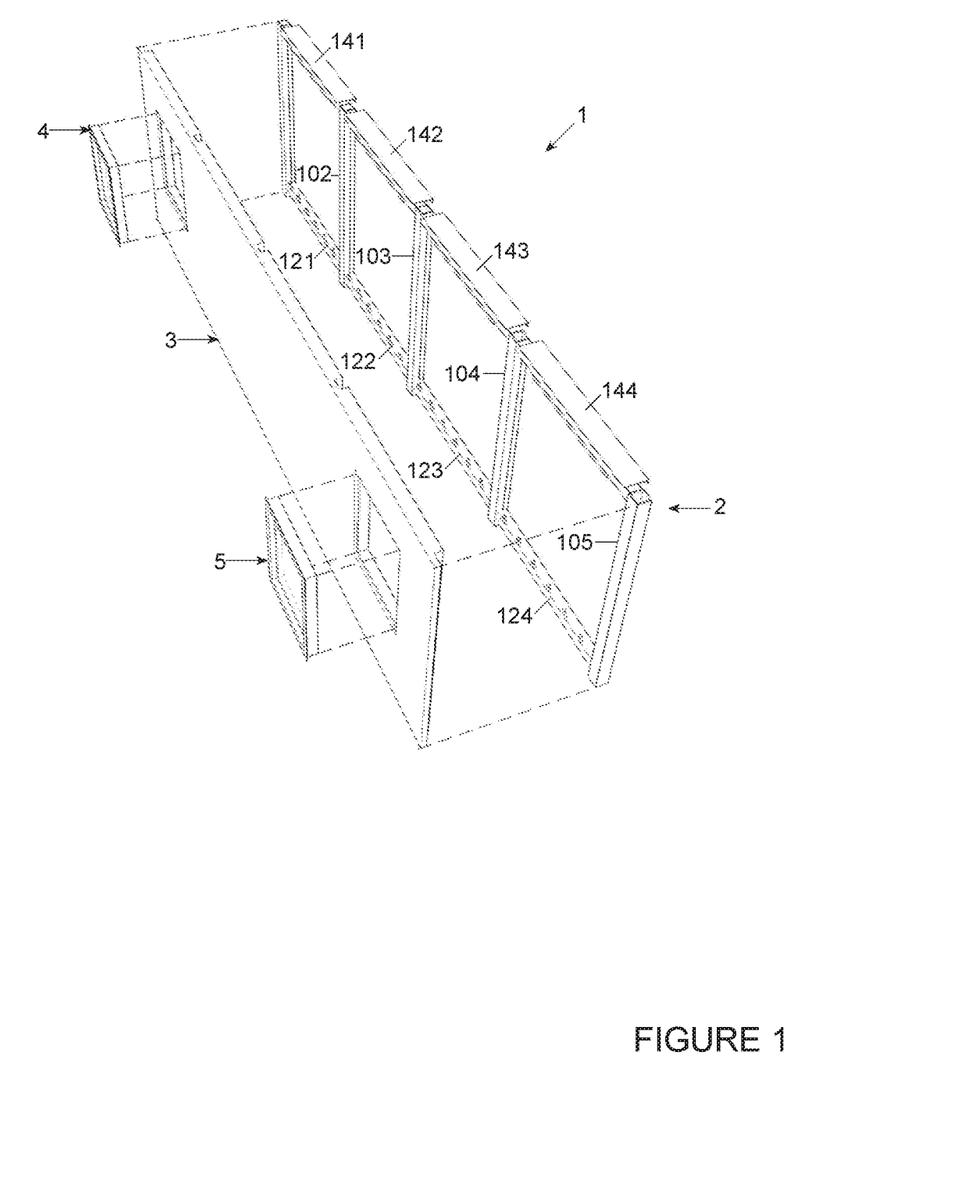
FIG. 1 illustrates a perspective view of the deconstructed Cellular Concrete Structural Steel Wall Modules and the use of a Wall Frame as a construction element.

FIG. 1 illustrates a perspective view of the deconstructed Cellular Concrete Structural Steel.

Figure 2:
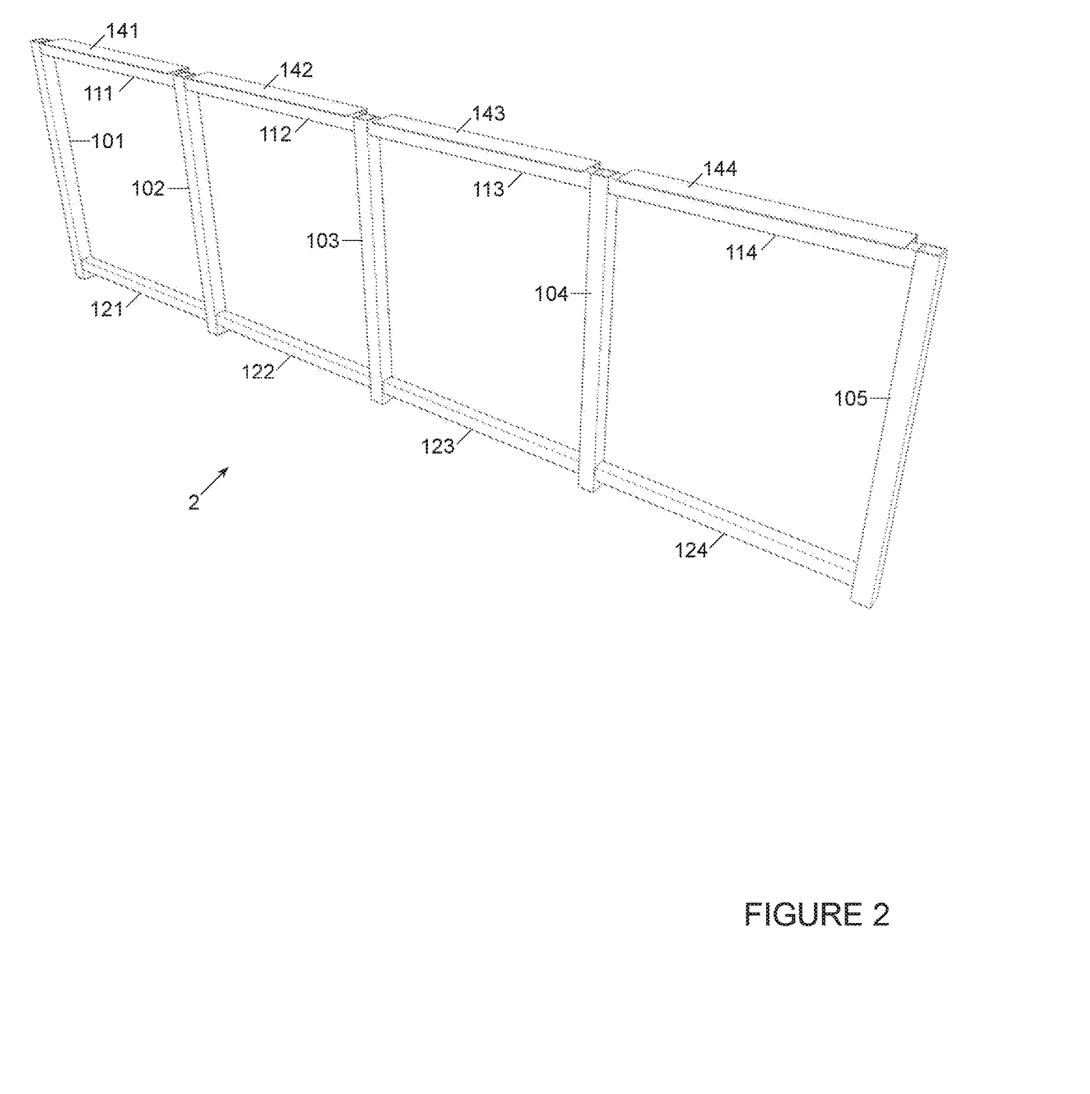
FIG. 2 illustrates a perspective view of a Wall Frame.

Wall Module 1 which includes the 4 segment Wall Frame 2 used as a core construction element. The present Wall Frame 2 typically uses a plurality of Vierendeel trusses or, alternatively, braced frames (not shown). The Wall Frame 2 can be implemented using a variety of frame technologies to provide the required strength. As shown in FIG. 2, the basic architecture of Wall Frame 2 consists of a plurality of vertically oriented Wall Frame Columns 101-105 which are interconnected by horizontally oriented Wall Frame Beams 111-114 and 121-124 (also termed "chords" herein) to form four segments of a truss. Unlike traditional Vierendeel trusses, the horizontal chords or Wall Frame Beams 111-114 and 121-124 of the Cellular Concrete Structural Steel Wall Module 1 do not span the entire length of each truss segment and cap the individual Wall Frame Columns 101-105, but instead the Wall Frame Columns 101-105 extend to the top and beyond the bottom chords (Wall Frame Beams 111-114 and 121-124), such that the chords interconnect the Wall Frame Columns 101-105 in a segmented manner. Thus, the horizontal chords do not provide the vertical load carrying capacity, but function to secure and brace the vertical Wall Frame Columns 101-105 and to provide shear capacity for the Wall Frame 2.

The only other element of the Cellular Concrete Structural Steel Wall Module 1 is Cellular Concrete Insert 3 (shown in FIG. 1), having windows 4, 5 is used as an infill in Wall Frame 2 to implement Cellular Concrete Structural Steel Wall Module 1. Thus, the Cellular Concrete Structural Steel Wall Module 1 consists of two elements, which makes the construction process simplified and resulting in significant cost reductions over conventional construction, especially for high-rise buildings.

Floor Shelves 141-144 are placed on the top surface of the top Wall Frame Beams 111-114, and are welded in place. The Floor Shelves 141-144, each comprising a planar element having openings formed in a top surface therein corresponding to the vertical members, can be placed on a top horizontal beam of a Wall Frame with the Mating Members protruding from the vertical members of the Wall Frame being inserted into the openings, wherein the Floor Shelf also includes a substantially planar surface extending in a horizontal direction perpendicular to the top horizontal beam into the interior of the multi-story building. The Floor Modules are placed on the Floor such that Floor Modules do not extend horizontally beyond the interior faces of the Wall Frames, so this is not a design like poured-in-place concrete where a horizontal floor is physically poured separating the columns above the floor and below it.

Figure 3:
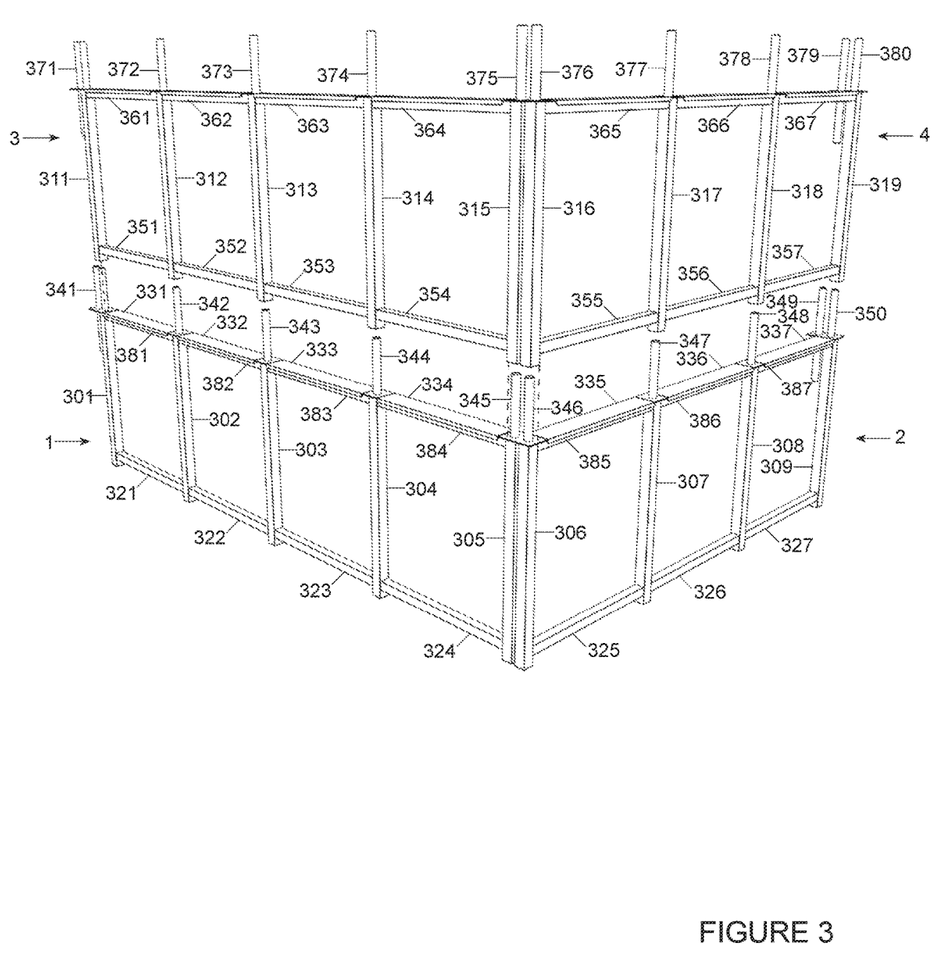
FIG. 3 illustrates a perspective view of two Wall Frames that are ready to be stacked at the corner of a building where the relationship between two Wall Frames perpendicular to each other on the same level can be seen.

FIG. 3 illustrates a perspective view of joining vertically stacked Wall Frames 1-4—one above the other, where the lower stacked Wall Frame 1 is adjacent to a perpendicular stacked Wall Frame 2 and the upper stacked Wall Frame 3 is adjacent to a perpendicular stacked Wall Frame 4, with the Cellular Concrete removed such that steel members of the Wall Frames 1-4 can be seen. In the Cellular Concrete Structural Steel Wall Modules, the building is really a set of stacked structural steel trusses without the use of individual vertically stacked columns. The design of the Cellular Concrete Structural Steel Wall Modules multi-story building creates walls of vertically stacked Wall Frames 1-4, not individual steel or concrete column framing members. The resultant multi-story building is structurally a plurality of wall trusses interconnected in a three-dimensional matrix to form a three-dimensional space frame to the extent of the building's exterior or walls and roof.

In this structure, each Wall Frame 1-4, as shown in FIG. 3, consists of a plurality of linearly aligned vertical columns 301-309, 311-319 along a horizontal length, at least the end vertical columns typically comprising hollow columns, and adjacent vertical columns are interconnected at the top and bottom by horizontal beams 321-327, 351-357, 361-367, and 381-387. As shown in FIG. 3, Wall Frames 1-4 are interconnected by the use of Mating Members 341-350, each insertable into top ends of the hollow columns of a first set of Wall Frames 1, 2 where the Mating Member protrudes above the top of the hollow column in which it is inserted and the bottom ends of the hollow columns of a second set of Wall Frames 3, 4 that are vertically positioned on top of the first set of Wall Frames 1, 2, such that when the Wall Frames 3, 4 are crane hoisted up into position, the Mating Members 341-350 enable the Wall Frames 3, 4 to be perfectly positioned on top of the installed Wall Frames 1, 2 located below, and the Mating Members 341-350 also hold the Wall Frames 3, 4 being installed in place immediately as the Mating Members 341-350 sticks into the Wall Frame Columns above 311-319 and below 301-309, to an extent the Wall Frames 3, 4 being installed will not lay over. It is stable immediately upon dropping it into position, and the positioning is perfect without effort. In addition, the Floor Shelves 331-337 are inserted at the top of Wall Frames 1 and 2. All Wall Frames 1-4 are manufactured to precise dimensional consistency, so assembly is reliable and simple with identical pieces aligning with one another. So Wall Frames 1-4 stack, not individual columns, which is different than customary structural steel design and construction. In addition, the gauge of the vertical columns can vary as their location in the multi-story building varies, with upper floors of the building requiring lighter gauge materials since the load carried there is reduced from that of the lower floors. As described in more detail below, the end Wall Frame Columns 301, 305, 306, 309 and 311, 315, 316, 319 of the Wall Frames 1, 2 and 3, 4 shown can be affixed together by means of welding, pinning, bolting, strapping, concrete infill and/or other means.

In the preferred embodiment, when you hoist a Wall Frame fitted up as a Wall Module, it consists of the structural elements, installed utilities, wall element, wall finishes, etc. There is no requirement to return to place hand laid brick as in-fill as is done in the traditional poured-in-place concrete buildings today.

Basic Truss Technology

The Wall Frame 2 can be fabricated using either braced frames or moment frames from a structural standpoint. Shear loads in a braced frame are carried by bracing members; shear loads in moment frames are carried by the moment capacity of the connections between the members of the frame. In the present Cellular Concrete Structural Steel Wall Modules the Wall Frames 2 are demonstrated using a Vierendeel truss (moment frame) configuration.

In engineering, a typical truss is a structure that consists of two-force members only, where the members are organized so that the assemblage as a whole behaves as a single object. A "two-force member" is a structural component where force is applied to only two points. Although this rigorous definition allows the members that form a truss to have any shape and be interconnected in any stable configuration, trusses typically comprise five or more triangular units constructed with straight members whose ends are connected at joints referred to as nodes. In this typical context, external forces and reactions to those forces are considered to act only at the nodes and result in forces in the members which are either tensile or compressive. For straight members, moments (torques) are explicitly excluded because, and only because, all the joints in a truss are treated as revolutes, as is necessary for the links to be two-force members.

A traditional planar truss is one where all the members and nodes lie within a two-dimensional plane, while a space truss has members and nodes extending into three dimensions. The top beams in a truss are called top chords and are typically in compression, the bottom beams are called bottom chords and are typically in tension, the interior beams are called webs, and the areas inside the webs are called panels. A truss consists of typically straight members connected at joints, traditionally termed panel points. Trusses are typically geometric figures that do not change shape when the lengths of the sides are fixed and are commonly composed of triangles because of the structural stability of that shape and design. A triangle is the simplest comparison, but both the angles and the lengths of a four-sided figure must be fixed for it to retain its shape.

A truss can be thought of as a beam where the web consists of a series of separate members instead of a continuous plate. In the truss, the lower horizontal member (the bottom chord) and the upper horizontal member (the top chord) carry tension and compression, fulfilling the same function as the flanges of an I-beam. Which chord carries tension and which carries compression depends on the overall direction of bending.

A variation of the planar truss is the Vierendeel truss which is a structure where the members are not triangulated but form rectangular openings and is a frame with fixed joints that are capable of transferring and resisting bending moments. Vierendeel trusses are rigidly-jointed trusses having only vertical members interconnected by the top and bottom chords which connect to the vertical members which face adjacent vertical members and at a location a predetermined distance below the top of the vertical members. The chords are normally parallel or near parallel. Elements in Vierendeel trusses are subjected to bending, axial force, and shear, unlike conventional trusses with diagonal web members where the members are primarily designed for axial loads. As such, it does not fit the strict definition of a truss (since it contains non-two-force members); regular trusses comprise members that are commonly assumed to have pinned joints, with the implication that no moments exist at the jointed ends. The utility of this type of structure in buildings is that a large amount of the exterior envelope remains unobstructed and can be used for fenestration and door openings as shown in FIG. 1. This is preferable to a braced-frame system, which would leave some areas obstructed by the diagonal braces.

Cellular Concrete Structural Steel Wall Module Process

Figure 4:
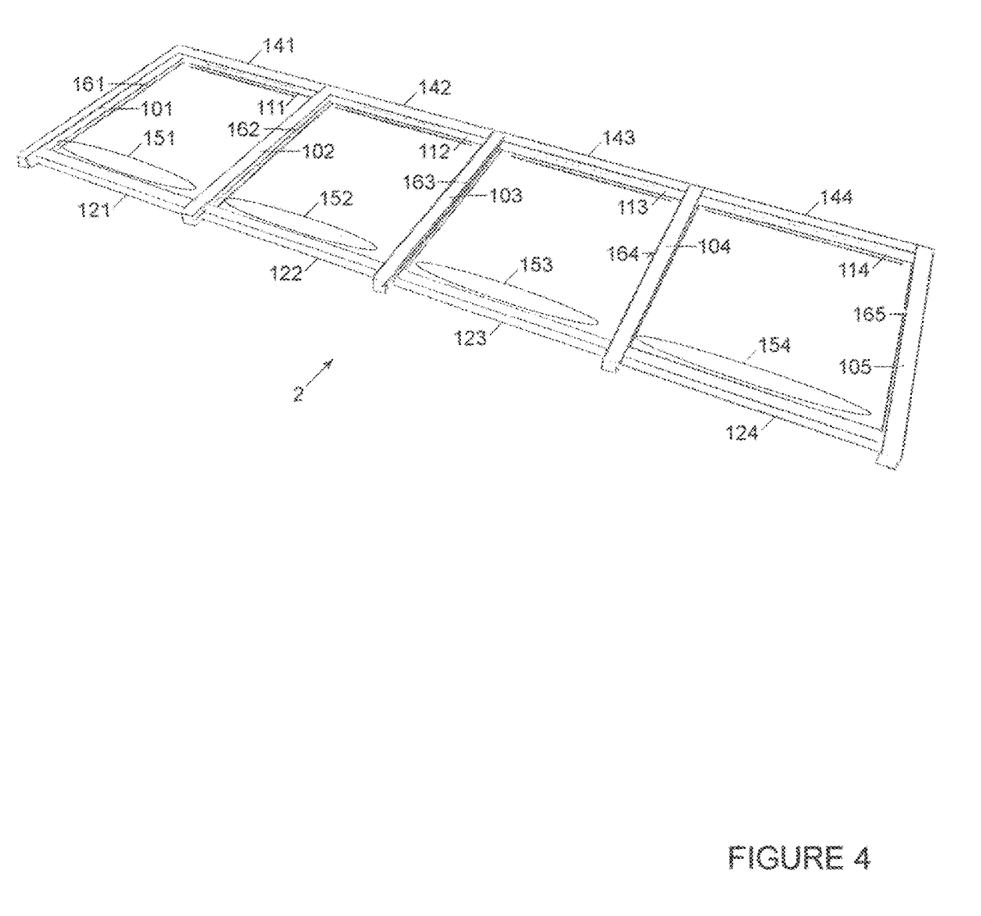
FIG. 4 illustrates a perspective view of a Wall Frame with isolation strips applied to the vertical columns.

As illustrated in FIG. 4, isolation strips 161-165 (such as foam tape) are applied to the vertical columns 101-105 to prevent the cellular concrete from adhering thereto, as noted below. Also, "Nelson Studs" 151-154 are anchor pins that are gun welded to the upper outside corner of the lower horizontal Wall Frame chord 121-124, providing a high capacity (thick) connection detail for the Cellular Concrete Insert 3 onto to Wall Frame 2 (rigid tube between columns, vertical and horizontal face contact on the lower chord thick section). Since a structural steel "special moment frame" has to be free to rotate (in the plane of the truss) during wind and seismic loading, the Cellular Concrete Insert 3 cannot restrain this Wall Frame rotation. Therefore, the Cellular Concrete Insert 3 covers the "outside" of the Wall Frame 2, and is tied to the Wall Frame 2 by the anchor pins on the lower chord. This affixment of the Cellular Concrete Insert 3, on a horizontal line, does not restrain rotation of the Wall Frame 2.

To carry out this separation design theme, the columns 101-105 of the Wall Frame 2 must also be covered with a separation element, such as foam tape 161-165 so that the full Wall Frame 2 is separated from the Cellular Concrete Insert 3 and the foam tape must also wrap around the outside edges of the columns to complete the isolation.

Figure 5:
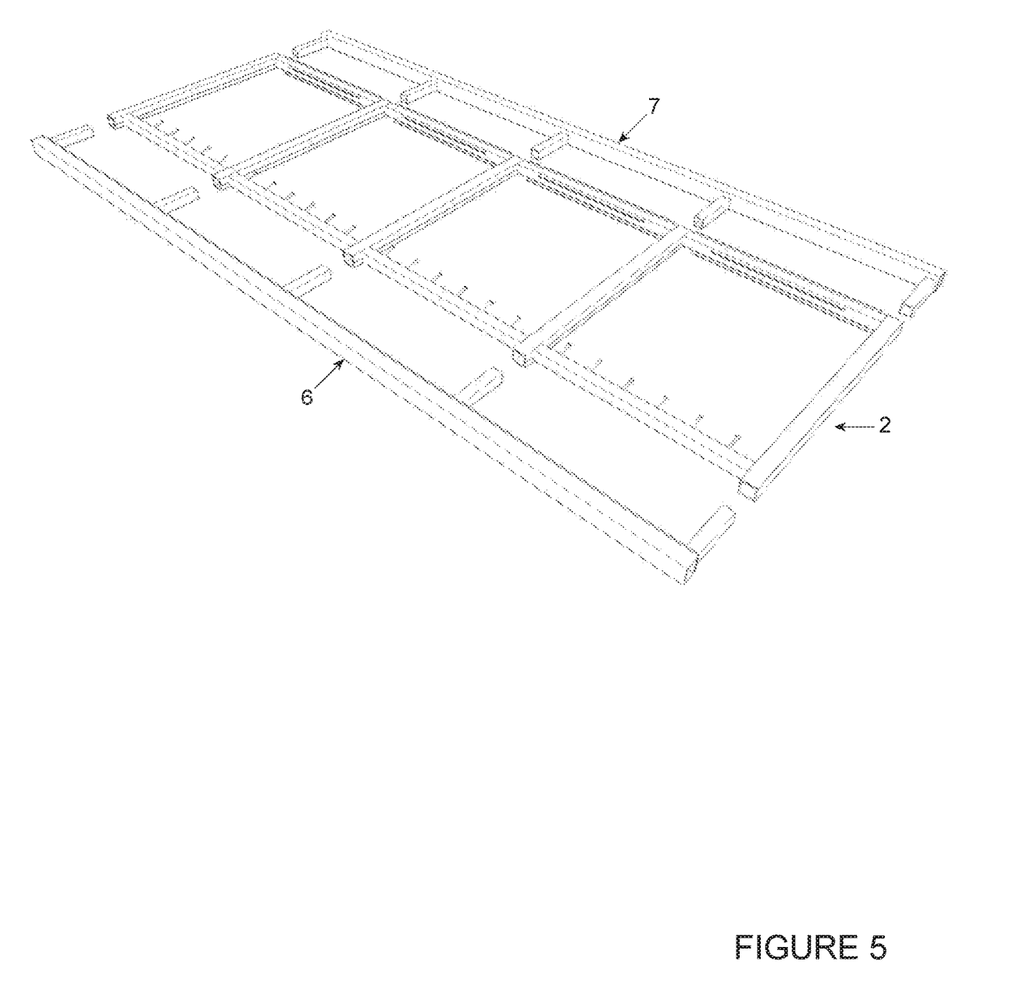
FIG. 5 illustrates a perspective view of a Wall Frame with Long Forms aligned to be attached to the Wall Frame.

In order to pour the Cellular Concrete Insert 3, a form must be created, the sides of which must be able to be quickly and reliably placed in position. As shown in FIG. 5, the open ends of the Wall Frame 2 can be utilized for this purpose, by creating a Long Form 6, 7 as shown. The Long Form 6, 7 has a steel plate, carefully located vertically to create the correct top edge and thickness of Cellular Concrete Insert 3, given the slight looseness of the Long Form 6, 7 in the Wall Frame 2 open ends and the steel plate also holds the Cellular Concrete Insert 3 back from the outside edge, thereby creating a clean and consistent construction joint exterior detail, and seismic room-to-move. The Steel Plate is notched around the Wall Frame steel to eliminate touch points. The Long Form 6 and 7 quickly slide into position, no alignment required, perfectly located. The upper edge of the steel plate is a convenient and quick Screed Line to accurately place Cellular Concrete Insert 3.

Figure 6:
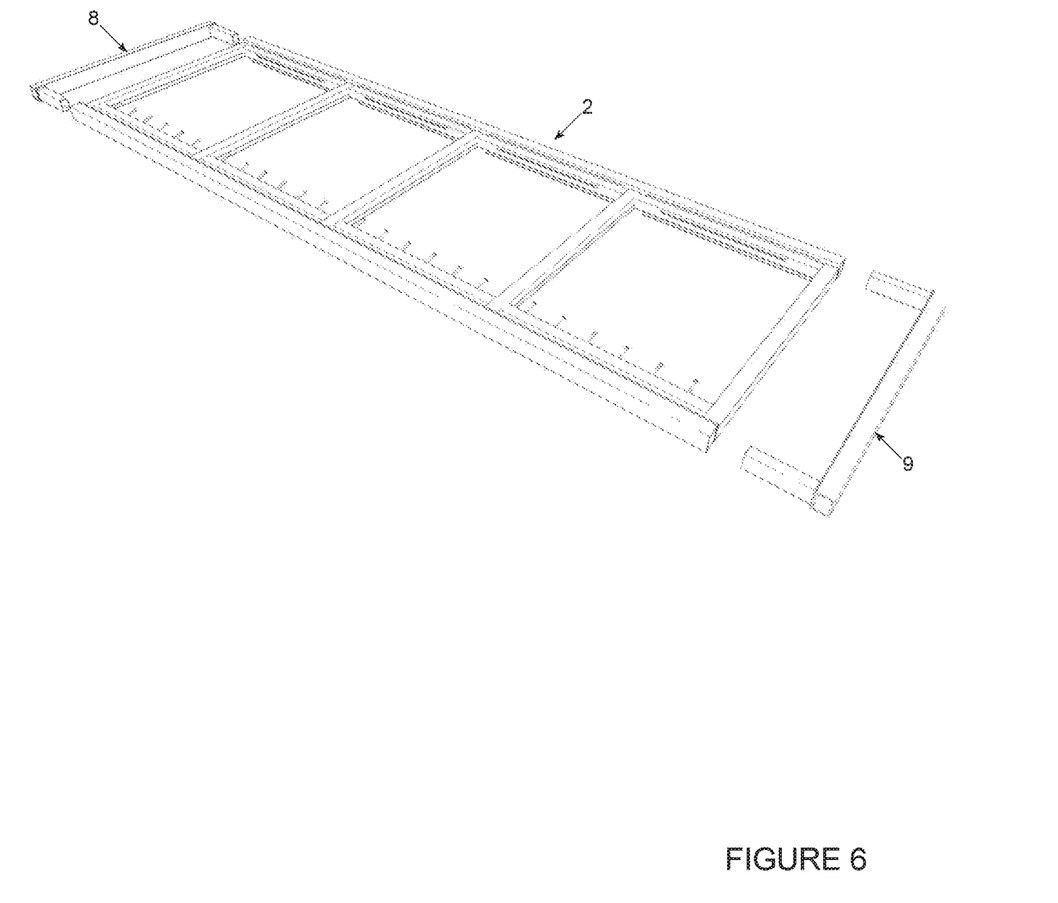
FIG. 6 illustrates a perspective view of a Wall Frame with Short Forms aligned to be attached to the Wall Frame.
Figure 7:
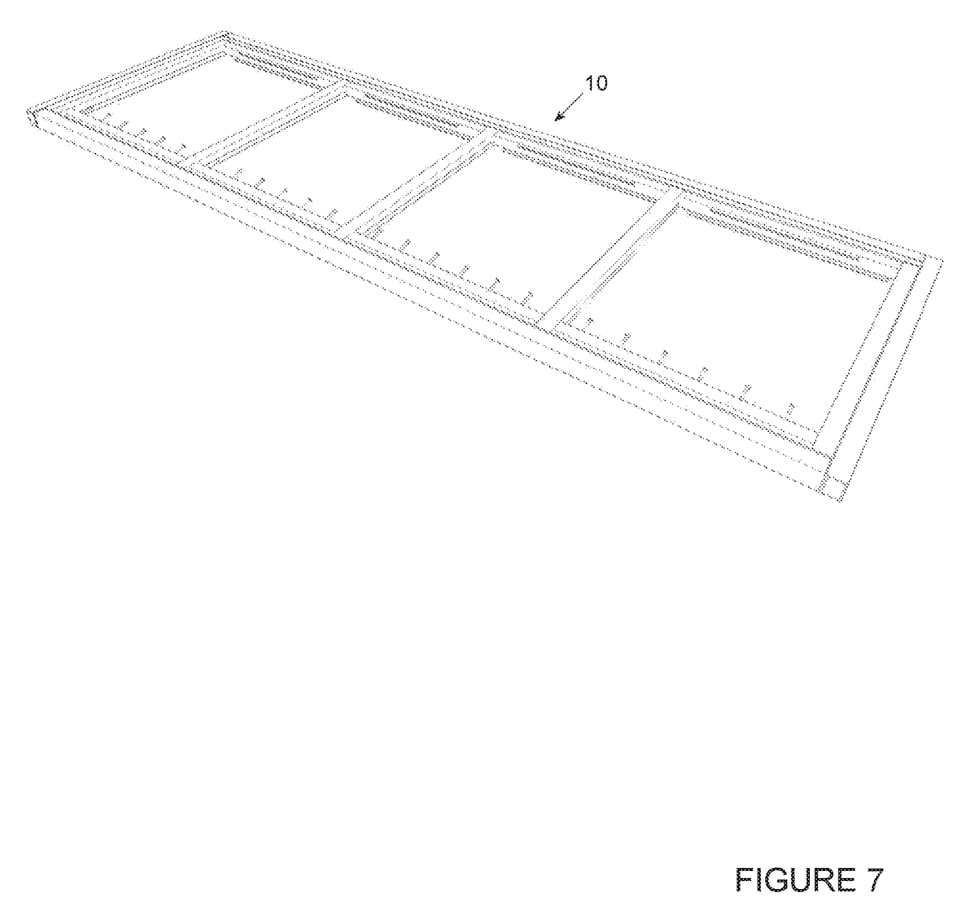
FIG. 7 illustrates a perspective view of the Wall Frame prepared to the application of cellular concrete.

The Short Forms 8, 9, which are provided for the short ends, are illustrated in FIG. 6 and have a similar function and design as the Long Forms 6, 7. The steel plate on the Short Forms 8, 9 creates the same Screed Line and consistent vertical construction and isolation joint. As shown in FIG. 7, with the Short Forms 8, 9 installed, a complete perimeter form is created; at the right height, in the right location, straight, with the correct hold back for the construction joint.

A consistent inside window frame surface is desired in the finished home, through the Cellular Concrete Insert 3 to the inside surface of the window. The Window Form 11, 12, in place shown in FIG. 8, should be even with the outer edge of the Cellular Concrete Insert 3 so that the shell can be poured and screed right over the top of the window form. The Window Form 11, 12 placement must be fast, easy, and reliable, at high throughput and should also create a recessed mounting surface for the window at installation, keeping some of the sun off the window surface, providing rain protection with a drip line and sloped sill, and visual interest.

Figure 8:
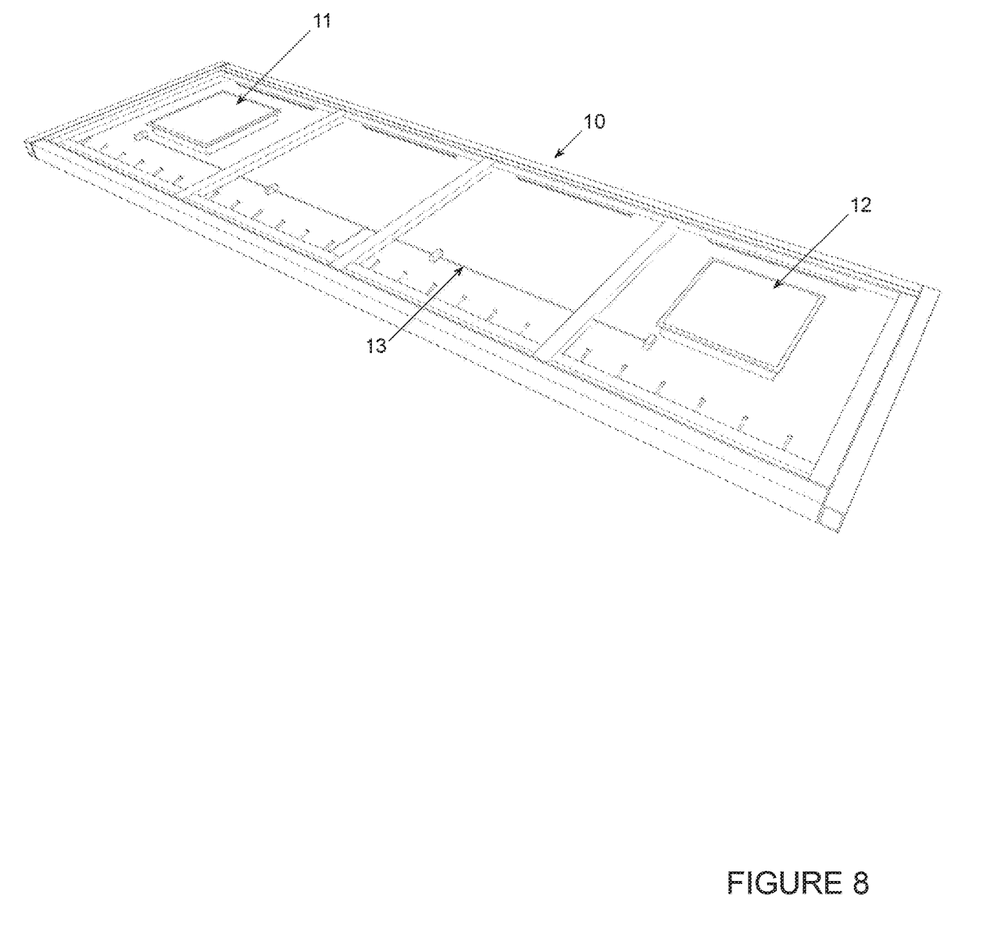
FIG. 8 illustrates a perspective view of the Wall Frame with the placement of window frames and utilities prior to pouring cellular concrete.

To accomplish this, the Window Form 11, 12 is a collapse able box, the bottom of which is at the same surface as the inside surface of the Cellular Concrete, with a planned depth to align with the Cellular Concrete Insert 3 pour, with an outer temporary form that created a larger opening and a cast surface for window mounting (ex. 25 mm-40 mm inside of the outer surface of the Cellular Concrete Insert 3).

Figure 9:
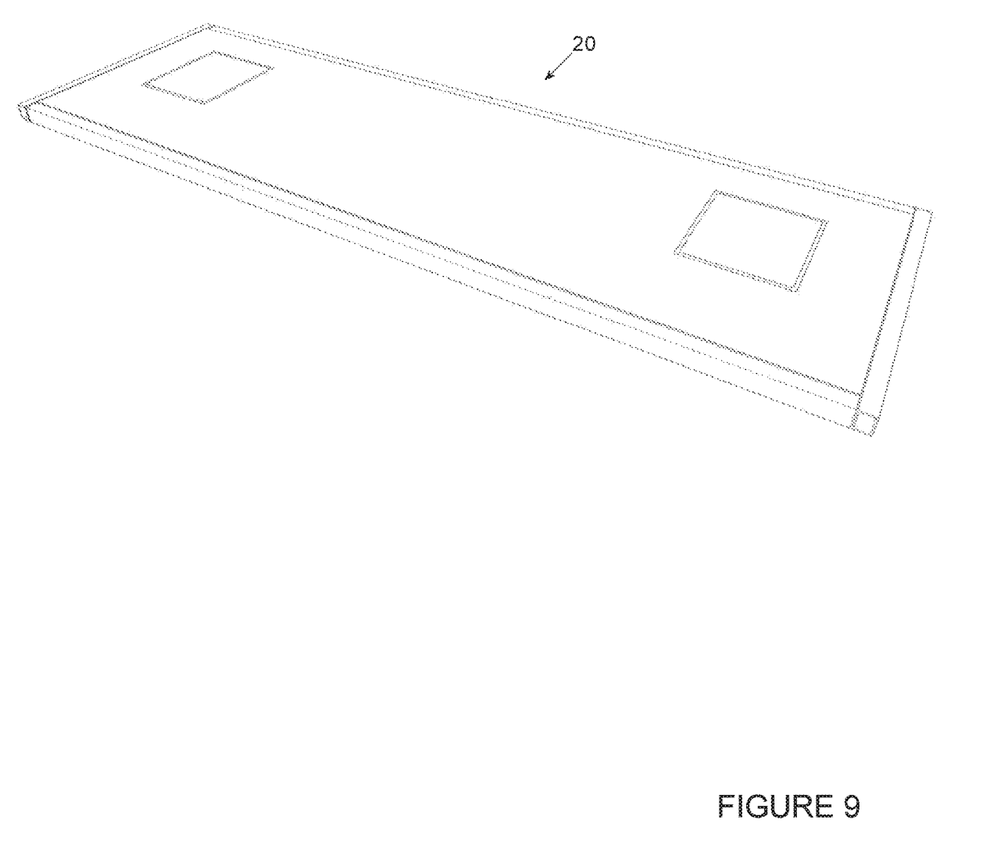
FIG. 9 illustrates the Wall Frame with the cellular concrete applied thereto creating the Cellular Concrete Structural Steel Wall Module.
Figure 10:
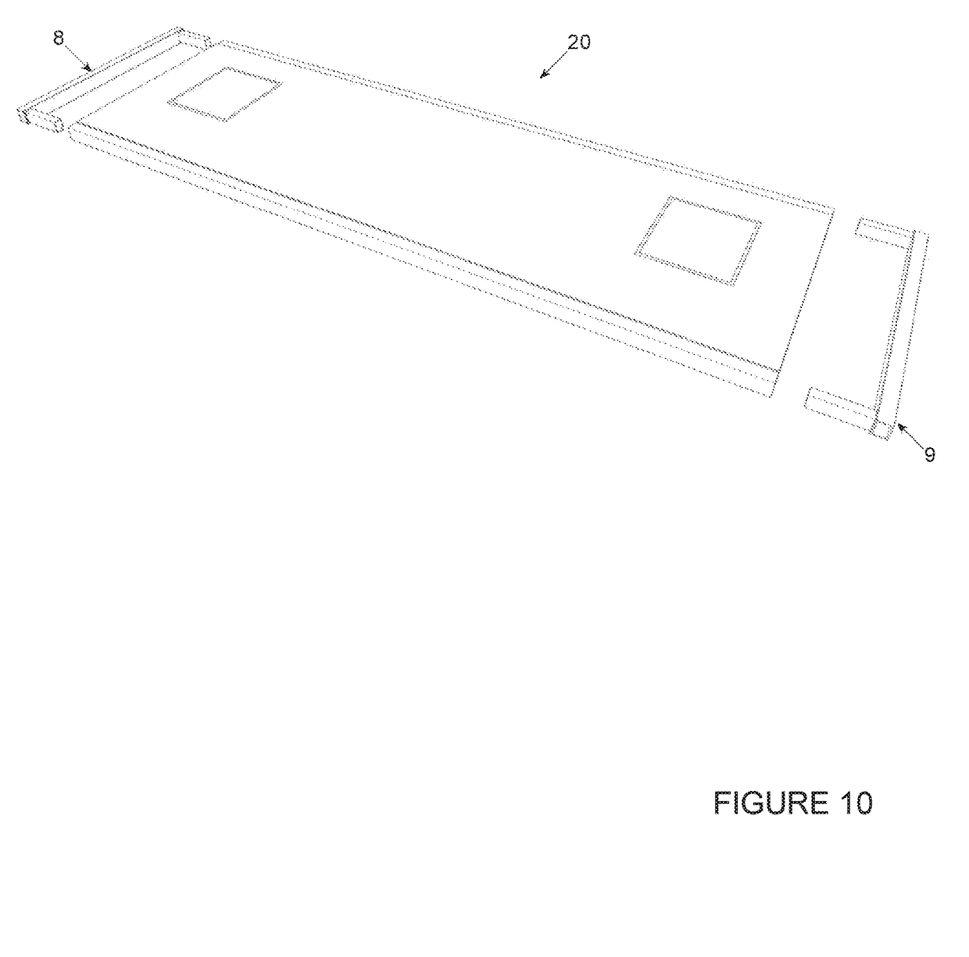
FIG. 10 illustrates a perspective view of a Wall Frame with Short Forms aligned to be removed from the Cellular Concrete Structural Steel Wall Module.

FIG. 9 illustrates the Wall Frame 2 with the cellular concrete 3 applied thereto.

Concrete Technology

Concrete is typically a composite material composed of coarse aggregate bonded together with a fluid cement which hardens over time. Most concretes used are lime-based concretes such as Portland cement concrete or concretes made with other hydraulic cements, such as fondants. In Portland cement concrete (and other hydraulic cement concretes), when the aggregate is mixed together with the dry cement and water, they form a fluid mass that is easily molded into shape. The cement reacts chemically with the water and other ingredients to form a hard matrix which binds all the materials together into a durable stone-like material. Often, additives (such as pozzolans or super plasticizers) are included in the mixture to improve the physical properties of the wet mix or the finished material. Most concrete is poured with reinforcing materials (such as rebar) embedded to provide tensile strength, yielding reinforced concrete. Thus, concrete can be poured into a form or column and will conform to the shape of the form, hardening in place to lock the elements in a durable stone-like material.

Cellular Concrete

A concrete mix uses cement (Portland or other cementitious material), coarse and fine aggregates, water and chemical admixtures. Aerated concrete is produced by the addition of an air-entraining agent to the concrete (or a lightweight aggregate such as expanded clay aggregate or cork granules and vermiculite) and is sometimes called cellular concrete, lightweight aerated concrete, variable density concrete, Foam Concrete and lightweight or ultra-lightweight concrete, not to be confused with aerated autoclaved concrete, which is manufactured off-site using an entirely different method.

Regular concrete is too dense for the application described herein. It is heavy and hard to work. After it sets one cannot cut into it, or nail into it. The surface is also ugly, cold, and hard in feeling unless covered by expensive finishes not integral to the structure. However, concrete is fluid, strong, and relatively cheap. It is available in almost every part of the world. It is possible to use a whole range of ultra-lightweight concretes which have a density and compressive strength very similar to that of wood. They are easy to work with, can be nailed with ordinary nails, cut with a saw, drilled with wood-working tools, and easily repaired.

The variable density reduces strength to increase thermal and acoustical insulation by replacing the dense heavy concrete with air or a light material such as clay, cork granules and vermiculite. There are many competing products that use a foaming agent that resembles shaving cream to mix air bubbles in with the concrete. All accomplish the same outcome: to displace concrete with air.

The configuration of the Cellular Concrete Structural Steel Wall Module 1 is to delete four elements (outside thin shell concrete, insulation hoard, light gauge steel studs, and inside drywall) from existing construction techniques and replace these four elements with one new singular element Cellular Concrete Insert 3 which is a 6 inch (more or less) section of Cellular Lightweight Concrete (CLC). The Cellular Concrete Structural Steel Wall Module 1 is constituted of the stacking structural steel Wall Frame 2 combined with a pour of CLC 2 simple elements only. One of the advantages of the CLC material is that it has reasonable insulating properties all by itself as a result of the entrained air in the CLC concrete mix. This entrained air gives a 6 inch CLC concrete wall an R value of almost RIO all b itself with no insulation layer, so by using CLC the insulating function can be provided without an independent insulating element.

Further, the interfaces and attachments of the former four elements also 20 away. It was complicated to interconnect and coordinate them. Now just the 6 inch CLC concrete element poured onto the stacking structural steel Wall Frame 2 and this CLC is inherently a flat surface by its very nature. So the need to create an inside flat vertical surface goes away, and there are no steel studs to cover up.

Given these factors, the Cellular Concrete Insert 3 is poured very fluid-like, which is high early strength and self-leveling. The top surface is easily created with a perimeter screed edge forms 6-9 on 4 sides, aligning with the top edge of Window and Door Forms. Many surface treatments are possible, including: broom finish, exposed aggregate, pattern, sculpting, etc. Color can be embedded in the Cellular Concrete, creating a long-lasting, non-weeping and seeping, no paint needed exterior.

Figure 11:
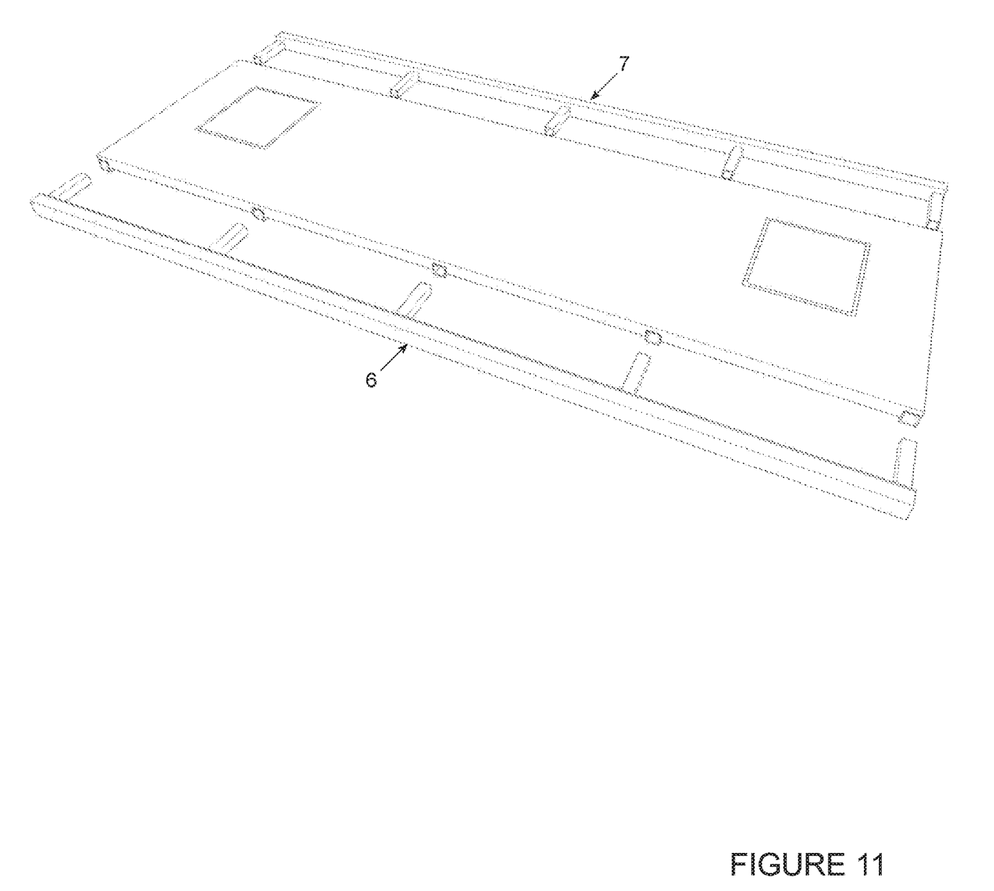
FIG. 11 illustrates a perspective view of a Wall Frame with Long Forms aligned to be removed from the Cellular Concrete Structural Steel Wall Module.
Figure 12:
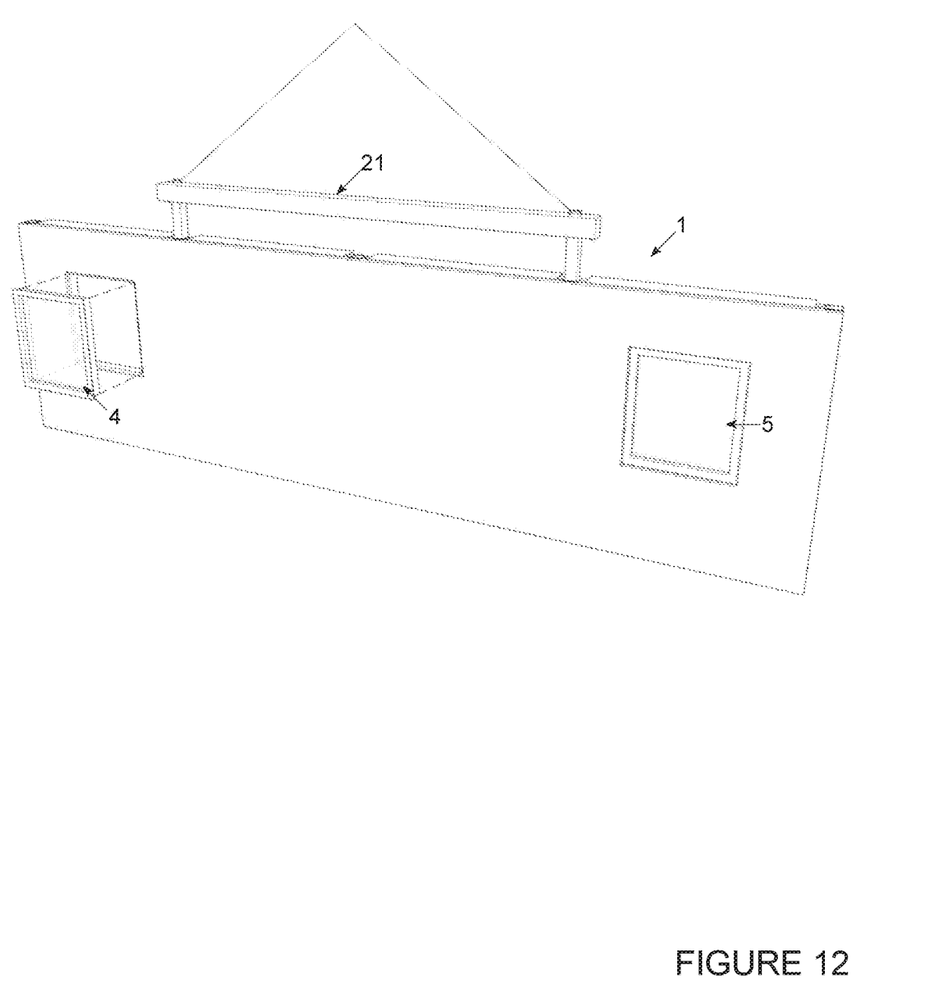
FIG. 12 illustrates a perspective view of a Cellular Concrete Structural Steel Wall Module being hoisted for installation.

It is anticipated that Cellular Concrete sets up within 12-24 hours at a strength sufficient to strip forms as shown in FIG. 11 which illustrates a perspective view of a Wall Frame with Long Forms aligned to be removed from the Wall Frame and FIG. 12 illustrates a perspective view of a Wall Frame being hoisted for installation.

After pouring the Cellular Concrete Insert 3, the open ends of the Wall Frame columns 101-105 can again be used, this time as insert points for "drops" from a crane spreader beam, as pick points. This configuration is fast, reliable, loads the Wall Frame 2 at its points of strength, is balanced, and it keeps the surfaces of the Wall Frame 2 open and free for work and finishing. In a vertical position, access is provided to remove the temp screws that affixed the Window Form. First, the outer form is removed, the one that created the wider opening and recessed mounting surface cast into the Cellular Concrete, then, the tall Window Form is collapsed and removed.

Face mount windows 14, 15 are installed on the cast Cellular Concrete surface as shown in FIG. 12. This creates a "solid corner" behind the window at its perimeter, though care must be taken detailing connection and water proofing. Outside trim is necessary to create a high level of design detail, with shadow line, rain and sun protection, and consistent execution of details.

In addition, electrical boxes and wiring, and any other in-wall systems, are installed to a pre-planned connection point.

SUMMARY

The present Cellular Concrete Structural Steel Wall Modules are interconnected in three dimensions with other modular construction elements to enable the rapid construction of multi-story buildings with improved quality of construction over that found in traditional multi-story building construction techniques. These Cellular Concrete Structural Steel Wall Modules will typically have a Cellular Concrete Wall Panel affixed to the structural steel Wall Frame, and also electrical and plumbing rough utility components installed in the Wall Frames.

What is claimed:

1. A wall module comprising:
   a moment frame comprising at least first and second parallel oriented, spaced apart hollow columns each having a top end and a bottom end, adjacent ones of which are rigidly inter-connected at the top end and the bottom end by first and second horizontal beams, respectively to enclose an interior space, wherein a first end of the first horizontal beam and a first end of the second horizontal beam are rigidly connected to a side of the top end and the bottom end, respectively of the first hollow column and a second end of the first horizontal beam and a second end of the second horizontal beam are rigidly connected to the side of the top end and the bottom end, respectively of the second hollow column to form a rectangular wall segment;
   cellular concrete material, inserted into the moment frame and filling at least a portion of the interior space between the first and second hollow columns and the first and second horizontal beams, that forms into a solid mass;
   isolation strips applied to the interior facing sides of the first and second hollow columns of the moment frame to prevent the cellular concrete material from adhering to the interior facing sides of the first and second hollow columns: and
   a plurality of anchor pins, affixed to an interior facing surface of the second horizontal beam, for providing the cellular concrete material with an attachment to the moment frame.

2. The wall module of claim 1 wherein said moment frame comprises:
   a plurality of hollow columns of tube steel aligned in a linear array, including said first and second parallel oriented. spaced apart hollow columns. with adjacent ones of the hollow columns being interconnected by a top horizontal beam spanning the space between adjacent vertical members and a bottom horizontal beam spanning the space between adjacent vertical members, the interconnection of the horizontal beams and the hollow columns being fixed joints that are capable of transferring and resisting bending moments.

3. The wall module of claim 1 wherein said moment frame comprises:
   vertical VIERENDEEL trusses with hollow columns of tube steel, including said first and second parallel oriented, spaced apart hollow columns, adjacent ones of which are interconnected at the top and bottom by horizontal beams, including said first and second horizontal beams, that form rectangular openings, as a frame with fixed joints that are capable of transferring and resisting bending moments.

4. The wall module of claim 1 further comprising:
   forms temporarily attached to exterior surfaces of the first and second parallel oriented, spaced apart hollow columns on a side opposite the side to which the first and second horizontal beams are attached to the first and second hollow columns and attached to exterior surfaces of the first and second horizontal beams on sides opposite to enclosed by the moment frame, to confine the cellular concrete material in the moment frame until it forms into a solid mass.

5. The wall module of claim 4 wherein the forms extend above a top surface of the first and second parallel oriented, spaced apart hollow columns and the first and second horizontal beams to enable the cellular concrete to cover one exterior surface of the first and second parallel oriented, spaced apart hollow columns and the first and second horizontal beams.

6. The wall module of claim 1 further comprising:
   utilities routed through an interior space encompassed by the moment frame.

7. A method of constructing a wall module comprising:
   rigidly interconnecting at least first and second parallel oriented, spaced apart hollow columns each having a top end and a bottom end, adjacent ones of which are interconnected at the top end and the bottom end by first and second horizontal beams, respectively to form a moment frame enclosing an interior space;
   connecting a first end of the first horizontal beam and a first end of the second horizontal beam to a side of the top end and the bottom end, respectively of the first hollow column and a second end of the first horizontal beam and a second end of the second horizontal beam to the side of the top end and the bottom end, respectively of the second hollow column to form a rectangular wall segment;
   inserting cellular concrete material into the moment frame and filling at least a portion of the space between the first and second hollow columns and the first and second horizontal beams that forms into a solid mass;
   applying isolation strips to interior facing surfaces of the columns of the moment frame to separate the moment frame from the cellular concrete material; and
   affixing a plurality of anchor pins to an interior facing surface of the second horizontal beam, for providing the cellular concrete material with an attachment to the moment frame.

8. The method of constructing a wall module of claim 7 further comprising:
   interconnecting a plurality of hollow columns of tube steel that are aligned in a linear array, with adjacent ones of the hollow columns by a top horizontal beam spanning the space between adjacent hollow columns and a bottom horizontal beam spanning the space between adjacent hollow columns, the interconnection of the horizontal beams and the hollow columns being fixed joints that are capable of transferring and resisting bending moments.

9. The method of constructing a wall module of claim 7 further comprising:
   constructing vertical Vierendeel trusses with hollow columns of tube steel, adjacent ones of which are interconnected at the top and bottom by horizontal beams that form rectangular openings, as a frame with fixed joints that are capable of transferring and resisting bending moments.

10. The method of constructing a wall module of claim 7 further comprising:
    temporarily attaching forms to exterior surfaces of the first and second parallel oriented, spaced apart hollow columns on a side opposite the side to which the first and second horizontal beams are attached to the first and second hollow columns and attached to exterior surfaces of the first and second horizontal beams on sides opposite to enclosed by the moment frame, to confine the cellular concrete material in the moment frame until it forms into a solid mass.

11. The method of constructing a wall module of claim 10 further comprising:

wherein the forms extend above a top surface of the first and second parallel oriented, spaced apart hollow columns and the first and second horizontal beams to enable the cellular concrete to cover one exterior surface of the first and second parallel oriented, spaced apart hollow columns and the first and second horizontal beams.

12. The method of constructing a wall module of claim 7 further comprising:

routing utilities through an interior space encompassed by the moment frame.

\* \* \* \* \*